United States Patent [19]

Weaver et al.

[11] Patent Number: 4,510,104
[45] Date of Patent: Apr. 9, 1985

[54] APPARATUS AND METHOD FOR AUTOMATICALLY CONTROLLING AN EXTRUDER FOR THERMOPLASTIC MATERIAL

[75] Inventors: Charles A. Weaver, Indianapolis; Joseph W. Stephens, Plainfield, both of Ind.

[73] Assignee: RCA Corporation, New York, N.Y.

[21] Appl. No.: 539,933

[22] Filed: Oct. 7, 1983

[51] Int. Cl.³ .................. B29B 1/10; B29B 3/02
[52] U.S. Cl. .................. 264/40.7; 264/142; 425/145; 425/162; 425/163; 425/205; 425/308; 425/DIG. 230
[58] Field of Search .............. 264/40.7, 40.1, 142–143; 425/147, 145, 162, 163, 205, 308, DIG. 230

[56] References Cited

U.S. PATENT DOCUMENTS

| | | | |
|---|---|---|---|
| 3,070,836 | 1/1963 | De Haven et al. | 264/40.7 |
| 3,595,533 | 7/1971 | Sutter | 425/205 |
| 3,728,056 | 4/1973 | Theysohn | 425/142 |
| 3,799,719 | 3/1974 | Bonikowski et al. | 264/40.7 |
| 3,890,078 | 6/1975 | Straumanis | 425/145 |
| 4,097,566 | 6/1978 | Bertin et al. | 425/142 |
| 4,152,380 | 5/1979 | Graves et al. | 264/40.7 |
| 4,228,050 | 10/1980 | Martin et al. | 358/129 |
| 4,249,876 | 2/1981 | Strausfeld et al. | 425/145 |
| 4,309,114 | 1/1982 | Klein et al. | 264/40.7 |
| 4,428,896 | 1/1984 | Stevenson | 264/40.4 |

FOREIGN PATENT DOCUMENTS

| | | | |
|---|---|---|---|
| 699683 | 12/1964 | Canada | 425/145 |
| 2302965 | 7/1974 | Fed. Rep. of Germany | 425/147 |
| 56-28841 | 3/1981 | Japan | 264/40.7 |
| 58-11129 | 1/1983 | Japan | 264/40.1 |
| 910424 | 3/1982 | U.S.S.R. | 425/145 |

*Primary Examiner*—Jeffery Thurlow
*Attorney, Agent, or Firm*—Birgit E. Morris; Donald S. Cohen

[57] ABSTRACT

There is described herein a method of operating an extruder for thermoplastic material to automatically control the output of the extruder. The extruder includes a kneader screw, a hopper having a feed screw for feeding the thermoplastic material in dry particulate form to the kneader screw and an outlet feed screw for removing the plastic material in molten form from the kneader screw. Each of the screws is operated by a separate electric motor. The method includes monitoring the current of the motor for the kneader screw. Variations in the current indicate variations in the operation of the kneader screw. Upon any variation in the current of the kneader screw motor, the speed of the hopper feed screw and/or the outlet feed screw is varied to compensate for the variation in the operation of the kneader feed screw and return the current to its original value.

11 Claims, 5 Drawing Figures

APPARATUS AND METHOD FOR AUTOMATICALLY CONTROLLING AN EXTRUDER FOR THERMOPLASTIC MATERIAL

The present invention relates to apparatus and method for automatically controlling an extruder for thermoplastic material, and more particularly, to apparatus and method for automatically achieving a uniform output from such an extruder.

BACKGROUND OF THE INVENTION

In the molding of thermoplastic material, the material after blending the various ingredients is generally formed into pellets. The blended material is fed in dry particulate form through an extruder which melts the material and forces the viscous molten material through a pelletizer. One type of extruder used for pelletizing thermoplastic material is made by BUSS-Condux, Inc. of Switzerland and includes a kneader having a screw which rotates and slightly reciprocates in a housing. The screw works the material and melts it as the material flows from the inlet end to the outlet end of the kneader. At the inlet end of the kneader is a hopper into which the material in dry particulate form is fed. The hopper contains a feeder screw to feed the material into the inlet end of the kneader. At the outlet end of the kneader is an outlet feeder screw which feeds the molten material from the outlet end of the kneader to a feeder screw which delivers the material to a pelletizer.

In the operation of this type of extruder, a zone of the molten thermoplastic material is formed at the outlet end of the kneader. To achieve uniform output from the extruder, it is desirable to maintain the depth of the molten zone uniform. If the depth of the molten zone increases, the larger amount of the viscous molten material in the zone increases the power required to turn the kneader screw. If the molten zone becomes too shallow, the power on the kneader screw may decrease and can cause some of the thermoplastic material to be fed to the outlet feed screw while still in dry particulate form and disrupt the proper pelletizing of the material.

If the thermoplastic material being pelletized is of uniform composition so that it has a uniform melting temperature, the extruder can be turned on so that each screw rotates at a predetermined speed and the material will pass through the extruder at a uniform rate. However, most thermoplastic materials contain fillers of various kinds. For example, a thermoplastic material used in making a capacitance electronic disc, such as is described in U.S. Pat. No. 4,228,050 to C. J. Martin et al., issued Oct. 14, 1980, entitled, "CONDUCTIVE MOLDING COMPOSITION" includes a mixture of polyvinylchloride resin, conductive carbon black particles, stabilizers for the resin and lubricants. The melting temperature of such a mixture may vary from batch to batch because of variations in the amount of each of the ingredients of the mixture; and can also vary even within a single batch if the ingredients are not thoroughly mixed. Even thermoplastic resins which do not include any fillers can vary in melting temperature from batch to batch because of weight average or number average molecular weight variations.

If there are variations in the melting temperature of the material being fed through the kneader, the viscosity of the material at the outlet end of the kneader will vary. This can cause undesirable variations in the depth of the molten zone which will vary the power requirements of the kneader screw. Heretofore, it has been the practice for an operator to watch for variations in the power requirements of the kneader screw, which occurs when the depth of the molten zone varies, and compensate for such changes by manually varying the speeds of the hopper feed screw, outlet feed screw and/or kneader screw. However, such manual control of the extruder is an art rather than a science and depends greatly on the skill and ability of the particular operator. Therefore, it would highly desirable to have means for automatically controlling the operation of an extruder to achieve a uniform output of the pelletized material.

SUMMARY OF THE INVENTION

A method for automatically controlling the output of an extruder for thermoplastic material which includes a kneader screw, an inlet feed screw for feeding dry particulate material to the inlet end of the kneader screw and an outlet feed screw for removing molten material from the outlet end of the kneader screw, each of said screws being rotated by a separate electric motor, maintains a zone of molten thermoplastic material of uniform depth at the outlet end of the kneader screw by continuously monitoring the current of the electric motor for the kneader screw as the thermoplastic material is fed along the kneader screw, and varying the speed of the inlet feed screw and/or outlet feed screw when variations in the current of the kneader screw motor are noted, so as to maintain the current at a substantially uniform level.

DETAILED DESCRIPTION OF PREFERRED EMBODIMENT

Figure 1:
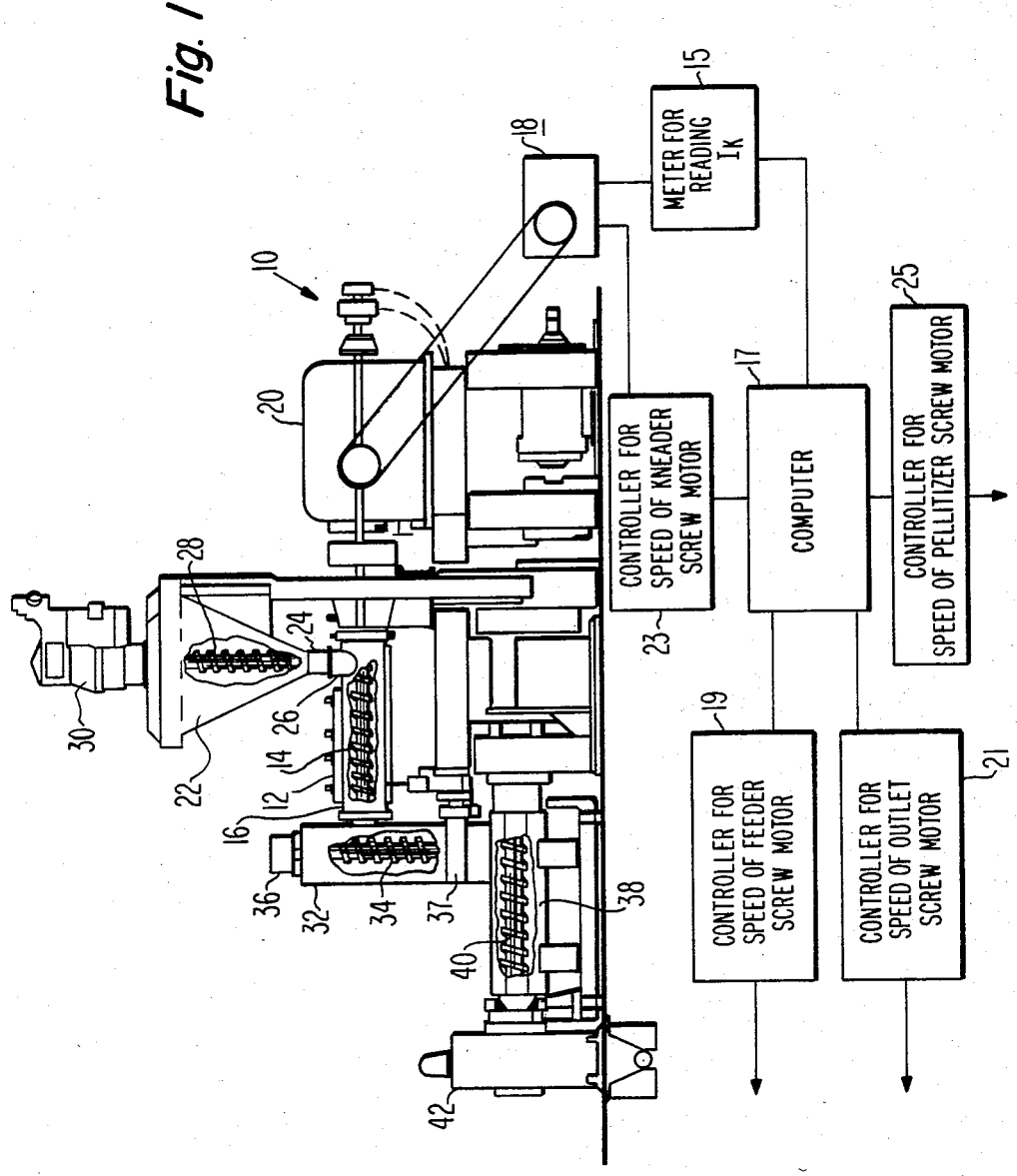
FIG. 1 is a schematic view, partially broken away, of an extruder which can be operated by the method of the present invention.

Referring initially to FIG. 1, one form of an extruder which can be operated by the method of the present invention is generally designated as 10. Extruder 10 includes a kneader 12 having a screw 14 extending longitudinally through and supported in a housing 16 for rotation and slight reciprocation of the screw 14. The kneader screw 14 is operated by a motor 18 through a gear train mechanism 20. At the inlet end of the kneader housing 16 is a hopper 22 having an exit end 24 which is connected to an inlet opening 26 in the kneader housing 16. In the hopper 22 is a vertically extending feed screw 28 which extends to the inlet opening 26 of the kneader housing 16. The hopper feed screw 28 is rotatably supported in the hopper 22 and is driven by a electric motor 30.

At the outlet end of the kneader housing 16 is a housing 32 containing a vertically extending outlet feed screw 34. The outlet feed screw 34 is rotated by a motor 36. The outlet housing 32 is joined to a vacuum chamber 37 which connects into the back end of a horizontally extending housing 38 which contains a pelletizer feed screw 40. On the front end of the pelletizer feed screw housing 38 is a pelletizer 42. As is well known, the pelletizer 42 includes a die plate having a plurality of openings therethrough into which the molten thermoplastic material is forced to form it into spaghetti-like strips. A knife blade is rotated across the front surface of the die plate to cut the strips into small pellets. The pelletizer feed screw 40 and the blade of the pelletizer 42 are rotated by electric motors, not shown.

In the operation of the extruder 10, the thermoplastic material in dry particulate form is fed into the hopper 22. The hopper feed screw 28 feeds the thermoplastic material into the inlet end of the kneader housing 16. The kneader screw 14 picks up the thermoplastic material and carries it along the kneader housing 16. As the material is carried along by the kneader screw 14, the thermoplastic material is worked by the kneader screw 14 so that it becomes heated up and is formed into a viscous molten state when it reaches the outlet end of the kneader housing 16. The thermoplastic material in the viscous molten state flows into the outlet feed screw housing 32 and is carried by the outlet feed screw 34 from the kneader housing 16 to the pelletizer feed screw housing 38. The molten thermoplastic material is then carried by the pelletizer feed screw 40 to the pelletizer 42 where it is formed into small pellets.

As previously described, a zone of the viscous molten thermoplastic material is formed at the outlet end of the kneader 12 and it is desirable to maintain the depth of the material in this zone uniform in order to achieve a uniform output of the pellets from the extruder 10. By depth of the zone is meant the distance the zone extends longitudinally along the kneader 12 from its outlet end. We have found that if the speed of rotation of the kneader screw 14 is maintained constant and the voltage applied to the kneader screw motor 18 is maintained constant, variations in the depth of the molten zone will cause variations in the current to the kneader screw motor 18. If the molten zone increase in depth, more power is required to maintain the constant speed of rotation of the kneader screw 14 so that the kneader screw motor 18 current will increase. Conversely, if the depth of the molten zone decreases, less power is required to maintain the rotational speed of the kneader screw 14 so that the current to the kneader screw motor 18 decreases.

In the method of the present invention for maintaining a constant output of the extruder 10, the current to the kneader screw motor 18 is constantly monitored, such as by meter 15, to determine variations in the depth of the molten zone. Constant monitoring includes either continuously monitoring the kneader motor current or periodically monitoring the kneader motor current at set intervals. Variations in the current to the kneader screw motor 18 is then used to vary the speed of rotation of the hopper screw motor 30 and/or the outlet feed screw motor 36. If the kneader screw motor current increases indicating an increase in the depth of the molten zone, the speed of the hopper feed screw motor 30 can be decreased to decrease the amount of material fed to the kneader screw 14 and/or the speed of the outlet feed screw motor 36 can be increased to increase the amount of the molten material carried away from the kneader 12. Decreasing the amount of fresh material fed to the kneader 12 and/or increasing the amount of material taken away from the kneader 12 will decrease the depth of the molten zone. Conversely, if the current to the kneader screw motor 18 decreases, indicating a decrease in the depth of the molten zone, the speed of the hopper feed screw motor 30 can be increased to feed more material to the kneader 12 and/or the speed of the outlet feed screw motor 36 can be decreased to decrease the amount of the molten material taken from the kneader 12.

This operation can be carried out by a computer 17, such as a programmable controller, which monitors the current meter 15 for the kneader screw motor 18. If the kneader motor current varies from the initially set current, the computer 17 can then change by an incremental amount the speed of the feeder screw motor 30 by means of a controller 19 and/or the outlet feed screw motor 36 by means of a controller 21. After waiting a set delay time to permit the change to take effect, the current of the kneader screw motor 18 is again read to determine whether it has returned to its initial value. If not, the computer 17 can again make a change in the speeds of the hopper feed screw motor 30 and/or outlet feed screw motor 36. This can be repeated until the current of the kneader feed screw motor 18 has returned to its initial value. Changes in the current of the kneader feed screw motor 18 can be accomplished by changing the speeds of either the hopper feed screw motor 30 or the outlet feed screw motor 36 or by changing speeds of both of these motors either simultaneously or in succession. The computer 17 can also be connected to controllers 23 and 25 for controlling the speeds of the kneader screw motor 18 and the pelletizer feed screw motor.

Figure 2:
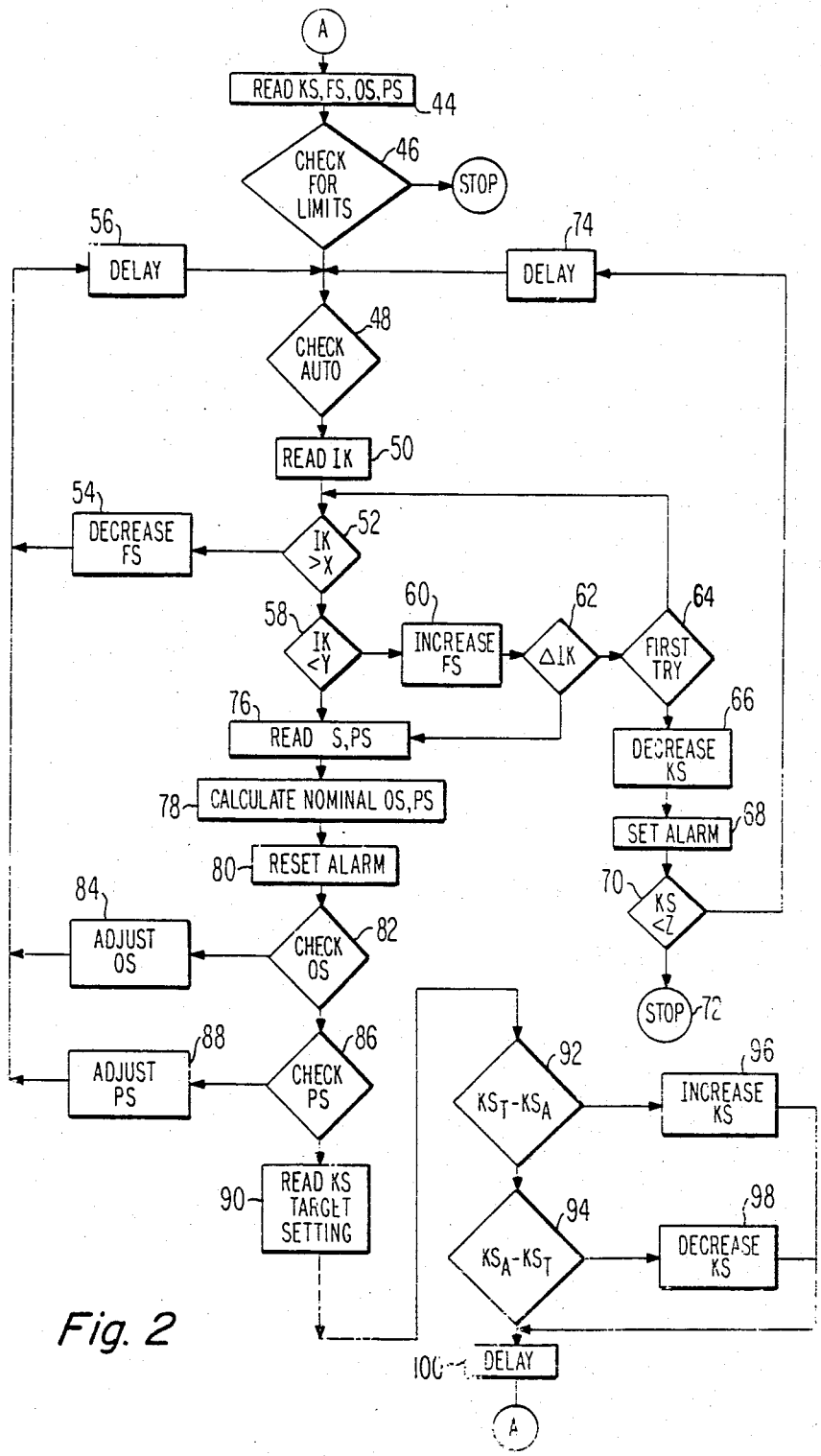
FIG. 2 is an outline of a computer program for carrying out the method of the present invention.
Figure 3:
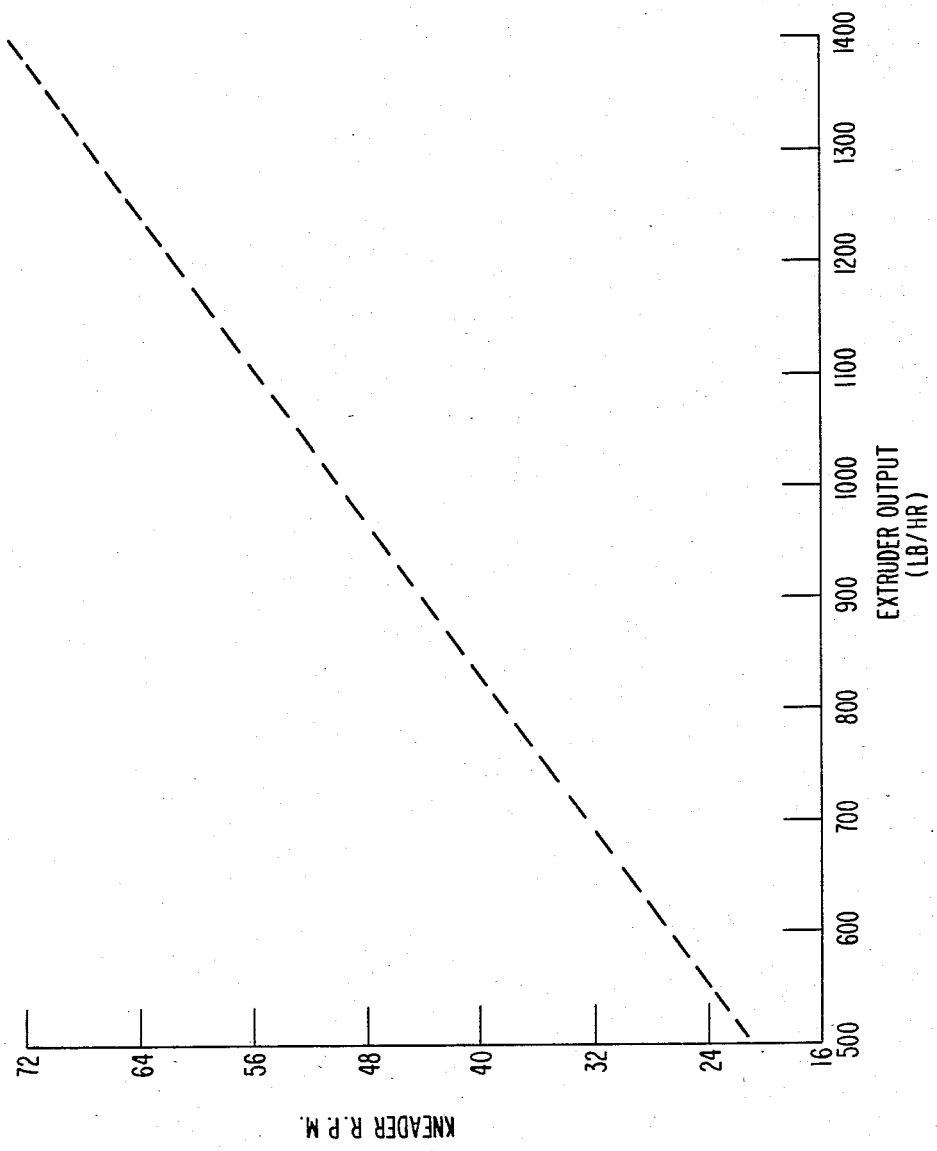
FIG. 3 is a graph of the extruder output versus kneader rpm.
Figure 4:
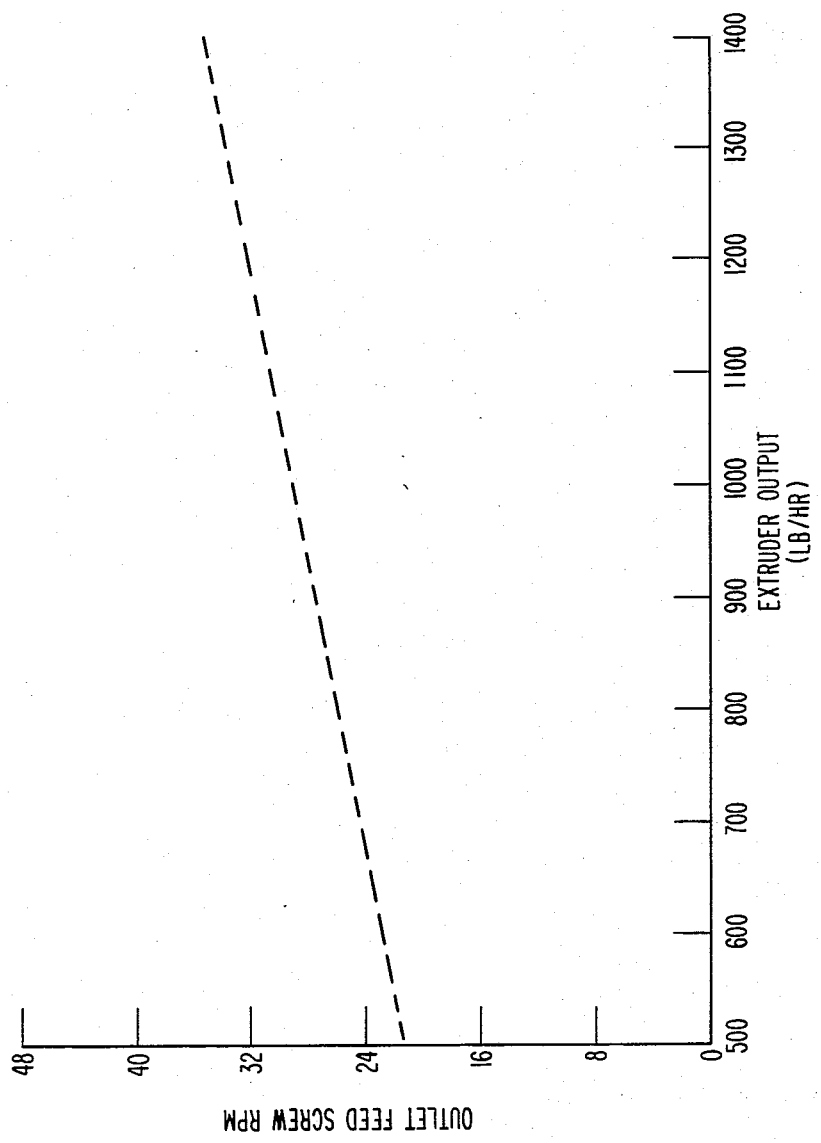
FIG. 4 is a graph of the extruder output versus output feed screw rpm.
Figure 5:
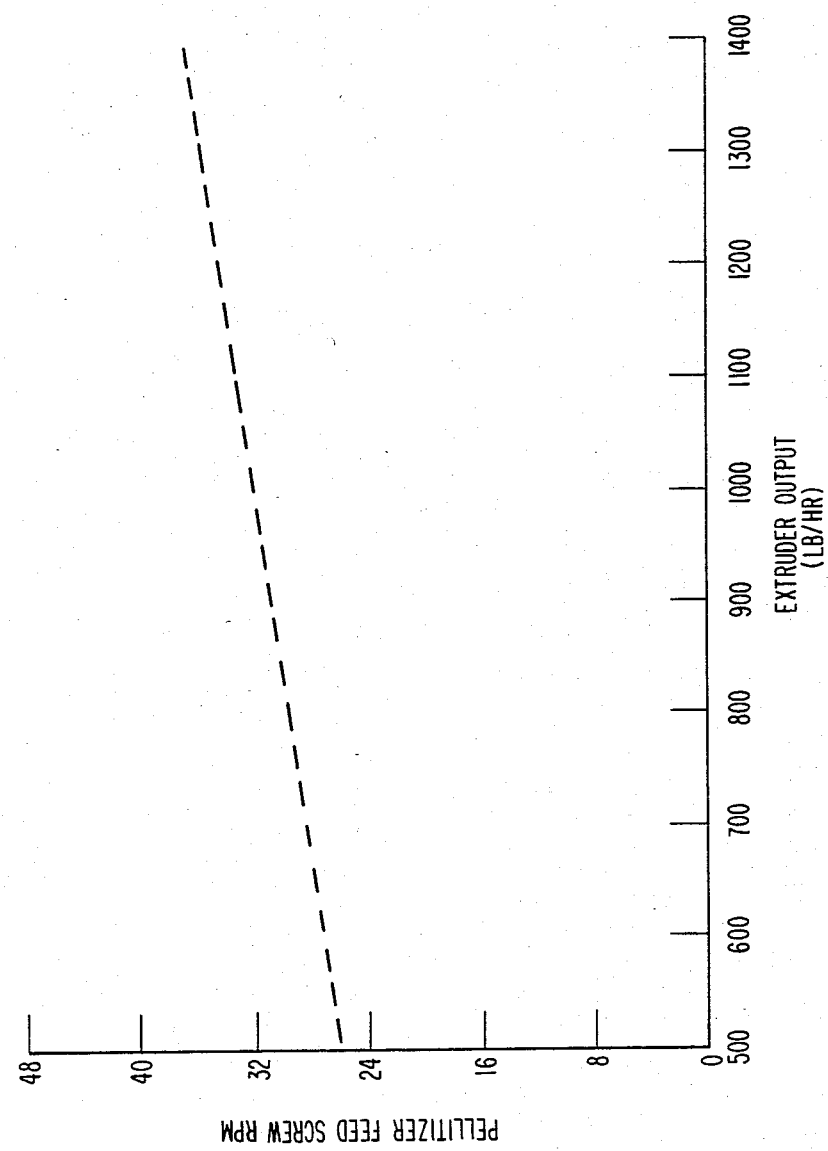
FIG. 5 is a graph of extruder output versus pelletizer feed screw rpm.

Referring to FIG. 2, there is shown a flow chart of a computer program which can be used to carry out the method of the present invention. To carry out this program, a computer is connected to controls on a control panel where an operator can manually set the speeds for the various motors. The computer is also connected to instrumentation for reading the speeds of the various motors and the current to the kneader feed screw motor 18. To operate the extruder 10 using this program, the operator sets the controls for the motors of the kneader screw (KS), hopper feed screw (FS), outlet feed screw (OS) and pelletizer feed screw (PS) for the desired speed to achieve the desired output. These speeds are obtained from a table which is made up from graphs such as shown in FIGS. 3–5. These graphs are obtained empirically for particular compositions of material to be pelletized.

The computer starts the program as indicated at 44 by reading the speeds of the kneader screw, hopper feed screw, outlet feed screw and pelletizer feed screw, and checks each of these speeds to see that they are within certain specified limits as indicated at 46. If any one of the feed screws is not within these specified limits, the operation of the extruder 10 is stopped. However, if all of the feed screws are within their specified limits, the computer checks at 48 to determine whether the operator has set the automatic control. If the automatic control is set, then the computer reads at 50 the kneader screw motor current, which will hereinafter be referred to as (Ik). The computer then checks to see that the kneader screw motor current (Ik) is within certain limits. These limits are those that set the kneader motor current to provide the speed at which the kneader screw will operate when the molten zone of the material at the outlet of the kneader is at its optimum depth. Thus, variations in the depth of the molten zone will cause the kneader screw motor current (Ik) to vary outside of these set limits. At 52, the kneader screw motors current (Ik) is checked to determine whether it is above the maximum of the limit, which would indicate that the molten zone is too deep. If the current (Ik) is above this maximum, the speed of the hopper feed screw is decreased an incremental amount at 54. After a short delay as indicated at 56 to allow the decrease in the hopper feed screw motor to take effect, the current (Ik) is again read at 50. This cycle is repeated until the current (Ik) is below the upper limit.

If the current (Ik) is below the upper limit or once it is returned to a value below the upper limit, it is checked at 58 to determine whether it is above a set lower limit. If the current (Ik) is below the lower limit, then the speed of the hopper feed screw is increased an incremental amount as indicated at 60. Increasing the speed of the hopper feed screw increases the amount of material fed into the kneader and should increase the depth of the molten region to increase the current (Ik). To determine whether there is an actual increase in the hopper feed screw motor speed, the current (Ik) is checked to see whether there has been a change in the current as indicated at 62. If there is no change in the current (Ik) at the first time the hopper feed screw motor speed is increased as indicated at 64, the program goes back to check the current (Ik) again and if it is still below the minimum, the speed of the hopper feed screw motor is again increased. If on the second try there is still no change in the current (Ik), the speed of the kneader feed screw is decreased an incremental amount as indicated at 66 and an alarm is sounded as indicated at 68 to warn the operator that something may be wrong. The hopper feed screw motor has a maximum speed beyond which it will not go. If the speed of the hopper feed screw motor is at this maximum and the current (Ik) is below minimum the kneader screw speed must be decreased. The kneader screw speed is checked to see that it is above a minimum speed as indicated at 70. If the kneader feed screw speed is below this minimum, the operation is stopped as indicated at 72. However, if the kneader feed screw speed is above this minimum, after a delay as indicated at 74 to allow the change in the kneader feed screw speed to take effect, the cycle of reading the kneader motor current (Ik) is repeated.

If the current (Ik) is above the minimum value or there is a change in the current (Ik) after increasing the hopper feed screw speed, the next step is to read the speed of the outlet feed screw and the pelletizer feed screw as indicated at 76. As indicated at 78, the nominal speeds of the outlet feed screw and the pelletizing feed screw are then calculated. The nominal speed is based on the particular speed of the kneader screw and is calculated from the formula:

$$N = a \text{ (kneader speed)} + b$$

where a and b are constants based on the relation of the slope of the straight line curve for the exit feed screw (FIG. 4) and the pelletizer feed screw (FIG. 5) with respect to the slope of the line for the kneader screw (FIG. 3).

For the graphs shown in FIGS. 3, 4 and 5, a and b for the exit feed screw and pelletizer feed screw are as follows:

|  | a | b |
|---|---|---|
| Exit feed screw | 0.5 | 8.7 |
| Pelletizer feed screw | 0.55 | 3.4 |

After the nominal speed of the outlet feed screw and pelletizer feed screw are calculated, the alarm shown at 68 is reset, as indicated at 80, to make sure that the alarm will operate if necessary. As indicated at 82, the nominal outlet feed screw speed is then compared with the actual speed and if they are not the same, the actual speed is adjusted to the nominal speed as indicated at 84. If an adjustment of the outlet feed screw is made, there is short delay, as indicated at 56, to allow the change to take effect and the reading of the kneader motor current (Ik) is repeated. Once the outlet feed screw speed is equal to the nominal outlet feed screw speed, the pelletizer feed screw speed is checked with the nominal pelletizer feed screw speed as indicated in 86. If they are not the same, the speed of the pelletizer feed screw is adjusted as indicated at 88 and after a delay to allow the adjustment to take effect the reading of the kneader motor current (Ik) is repeated.

After both the outlet feed screw speed and the pelletizer feed screw speed are made equal to their nominal speeds, the target setting of the kneader feed screw speed on the control panel is checked as indicated at 90 to determine whether the operator has made any change in the setting. The operator may have made a change in the target setting of the kneader feed screw in order to change the output of the extruder 10. If the actual kneader speed is less or greater than the target setting by a preset incremental amount, such as 5 rpm, which would be indicated at either 92 or 94, the speed of the kneader screw is increased, as indicated at 96 or decreased as indicated at 98 by that incremental amount. Then after a slight delay period as indicated at 100 to allow the change in the kneader screw speed to take effect, the cycle is repeated from the top until the actual kneader screw speed reaches the target screw speed.

Thus, it is seen that this program causes the kneader motor current (Ik) to be constantly monitored. If there is any change in the kneader motor current (Ik), which indicates that the depth of the molten zone has changed, the speed of the hopper feed screw is varied to either feed more or less of the particulate material to the kneader screw. Since the speed of both the outlet feed screw and the pelletizer feed screw are dependent on the output of the kneader feed screw, their speeds are compared to that of the kneader feed screw and adjusted to compliment the output of the kneader feed screw. Thus, this program performs the method of the present invention for automatically controlling and maintaining uniform the output of the extruder 10.

We claim:
1. A method of automatically controlling the output of an extruder for thermoplastic material which includes a kneader screw, an inlet feed screw for feeding dry particulate material to the inlet end of the kneader screw and an outlet feed screw for removing molten material from the outlet end of the kneader screw, each of said screws being rotated by a separate electric motor, said method comprising the steps of continuously monitoring the current of the electric motor for the kneader screw as the thermoplastic material is fed along the kneader screw, and varying the speed of the inlet feed screw and/or outlet feed screw upon variations in the current of the kneader screw motor to maintain the current at a substantially uniform level.

2. The method in accordance with claim 1 in which if the current of the kneader screw motor increases, the step of decreasing the speed of the inlet feed screw and/or increasing the speed of the outlet feed screw.

3. The method in accordance with claim 1 in which if the current of the kneader screw motor decreases, the step of increasing the speed of the inlet feed screw and/or decreasing the speed of the outlet feed screw.

4. A method in accordance with claim 1 in which the speed of the kneader screw, inlet feed screw and outlet feed screw are set to provide a desired output and the current of the kneader screw motor is monitored to determine whether it is within certain limits and if the kneader screw motor current is outside the limits the speed of the inlet feed screw is varied to bring the current back within the limits.

5. A method in accordance with claim 4 in which if the current of the kneader screw motor increases above the upper limit the speed of the inlet feed screw is decreased.

6. A method in accordance with claim 5 in which if the current of the kneader screw motor decreases below the lower limit the speed of the inlet feed screw is increased.

7. A method in accordance with claim 4 including determining the nominal speed that the outlet feed screw should rotate for the particular actual speed of the kneader screw and adjusting the actual speed of the outlet feed screw to the determined nominal speed.

8. In an extruder for thermoplastic material which includes a kneader screw, an inlet feed screw extending to the inlet end of the kneader screw for feeding dry particulate material to the inlet end of the kneader screw and an outlet feed screw at the outlet end of the kneader screw for removing molten material from the outlet end of the kneader screw, each of said screws being rotated by a separate electric means, the improvement comprising means for automatically controlling the output of the extruder comprising means for continuously monitoring the current of the electric motor for the kneader screw as the thermoplastic material is fed along the kneader screw, and means for varying the speed of the inlet feed screw and/or the outlet feed screw upon variations in the current of the kneader screw motor to maintain the current at a substantially uniform level.

9. An extruder in accordance with claim 8 in which the means for varying the speed of the inlet feed screw and/or the outlet feed screw is adapted to decrease the speed of the inlet feed screw and/or increase the speed of the outlet feed screw if the current of the kneader screw motor increases.

10. An extruder in accordance with claim 7 in which the means for varying the speed of the inlet feed screw and/or the outlet feed screw is adapted to increase the speed of the inlet feed screw and/or decrease the speed of the outlet feed screw if the current of the kneader screw motor decreases.

11. An extruder in accordance with claim 10 in which the means for automatically controlling the output of the extruder includes a computer for monitoring the current of the kneader screw motor and controllers for the motors of the inlet feed screw and outlet feed screw which controllers are operated by the computer to vary the speeds of the inlet feed screw and the outlet feed screw.

* * * * *